United States Patent
Satomi et al.

(10) Patent No.: US 7,015,929 B2
(45) Date of Patent: Mar. 21, 2006

(54) COLOR CONVERSION METHOD AND IMAGE PROCESSOR

(75) Inventors: Shinya Satomi, Suita (JP); Naoko Hiramatsu, Kyoto (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 0 days.

(21) Appl. No.: 10/900,304

(22) Filed: Jul. 28, 2004

(65) Prior Publication Data

US 2005/0219260 A1    Oct. 6, 2005

(30) Foreign Application Priority Data

Apr. 2, 2004    (JP) .............................. 2004-110420

(51) Int. Cl.
*G09G 5/02*    (2006.01)
*G06K 9/00*    (2006.01)

(52) U.S. Cl. ...................... 345/604; 345/600; 345/591; 345/593; 358/518; 358/521; 358/523; 382/162; 382/167

(58) Field of Classification Search ................ 345/427, 345/589–591, 593, 597, 600–604; 348/488, 348/453, 660, 661, 659; 358/521, 515, 518, 358/1.9, 3.23, 520, 523, 539; 382/162–167
See application file for complete search history.

(56) References Cited

U.S. PATENT DOCUMENTS

| 5,539,540 | A | * | 7/1996 | Spaulding et al. | ........... 358/518 |
| 2002/0093698 | A1 | * | 7/2002 | Kagawa | ...................... 358/518 |
| 2004/0263880 | A1 | * | 12/2004 | Ito et al. | ...................... 358/1.9 |

FOREIGN PATENT DOCUMENTS

| JP | 2000-184222 | 6/2000 |
| JP | 2002-152536 | 5/2002 |

* cited by examiner

*Primary Examiner*—Matthew C. Bella
*Assistant Examiner*—Wesner Sajous
(74) *Attorney, Agent, or Firm*—Buchanan Ingersoll PC

(57) ABSTRACT

In the case of color purification, images do not appear unnatural even by an input profile other than a certain particular input profile, no considerable labor is required for creating profiles and no large memory area is required for storing the profiles. A color conversion method includes holding a color space used for color conversion for color data having specific color space characteristics in advance, comparing color space characteristics of the inputted color data with color space characteristics of the color space held in advance, performing color conversion using gradation characteristics of the inputted color data and a color space of the inputted color data when a difference between the color space characteristics is a set threshold level or less, and performing color conversion using the gradation conversion data of the inputted color data and the color space held in advance when the difference is over the set threshold level.

8 Claims, 19 Drawing Sheets

FIG.9

LLU2

| R G B | C M Y K |
|---|---|
| 0, 0, 0 | 0, 0, 0, 255 |
| 0, 0, 16 | 106, 67, 0, 245 |
| 0, 0, 32 | |
| ⋮ | ⋮ |
| 255, 255, 255 | 0, 0, 0, 0 |

LATTICE POINT OF LIGHT YELLOW (R, G, B) = (255, 255, 192)
(C, M, Y, K) = (3, 4, 86, 1)

LLU2A

| LATTICE POINT NUMBER | RGB | CMYK |
|---|---|---|
| 1(RED) | (255, 0, 0) | (3, 251, 253,0) |
| 2 | (255, 16, 16) | (5, 241, 237,1) |
| 3 | (255, 32, 32) | (2, 225, 221,1) |
| 4 | (255, 48, 48) | (0, 204, 205,0) |
| 5 | (255, 64, 64) | (1, 195, 193,0) |
| 6 | (255, 80, 80) | (4, 171, 170,1) |
| 7 | (255, 96, 96) | (2, 158, 155,2) |
| 8 | (255, 112, 112) | (0, 143, 141,0) |
| 9 | (255, 128, 128) | (2, 127, 128,0) |
| 10 | (255, 144, 144) | (0, 110, 112,0) |
| 11 | (255, 160, 160) | (1, 95, 96, 0) |
| 12 | (255, 176, 176) | (2, 82, 79, 1) |
| 13 | (255, 192, 192) | (0, 62, 63, 0) |
| 14 | (255, 208, 208) | (0, 48, 47, 0) |
| 15 | (255, 224, 224) | (0, 31, 30, 0) |
| 16 | (255, 240, 240) | (2, 15, 16, 0) |
| 17(WHITE) | (255, 255, 255) | (0, 0, 0, 0) |

FIG.12

LLU2B

| LATTICE POINT NUMBER | RGB | C'M'Y'K' AFTER CORRECTION |
|---|---|---|
| 1(RED) | (255, 0, 0) | (0, 252, 254, 0) |
| 2 | (255, 16, 16) | (0, 244, 240, 0) |
| 3 | (255, 32, 32) | (0, 226, 222, 0) |
| 4 | (255, 48, 48) | (0, 204, 205, 0) |
| 5 | (255, 64, 64) | (0, 195, 193, 0) |
| 6 | (255, 80, 80) | (0, 173, 172, 0) |
| 7 | (255, 96, 96) | (0, 160, 157, 0) |
| 8 | (255, 112, 112) | (0, 143, 141, 0) |
| 9 | (255, 128, 128) | (0, 128, 129, 0) |
| 10 | (255, 144, 144) | (0, 110, 112, 0) |
| 11 | (255, 160, 160) | (0, 95, 96, 0) |
| 12 | (255, 176, 176) | (0, 83, 80, 0) |
| 13 | (255, 192, 192) | (0, 62, 63, 0) |
| 14 | (255, 208, 208) | (0, 48, 47, 0) |
| 15 | (255, 224, 224) | (0, 31, 30, 0) |
| 16 | (255, 240, 240) | (0, 16, 17, 0) |
| 17(WHITE) | (255, 255, 255) | (0, 0, 0, 0) |

COLOR CONVERSION METHOD AND IMAGE PROCESSOR

This application is based on Japanese Patent Application No. 2004-110420 filed on Apr. 2, 2004, the contents of which are hereby incorporated by reference.

BACKGROUND OF THE INVENTION

1. Field of the Invention

The present invention relates to an image processor for performing color conversion on color data to output color data having a color space different from that of the former color data, and a color conversion method using the image processor.

2. Description of the Prior Art

Generally, color characteristics of peripheral equipment such as a scanner, a digital camera, a printer, a printing machine and a display depend on a manufacturer or a type of equipment. A color management system (CMS) is proposed and employed in order to use such peripheral equipment and to perform consistent color reproduction without dependence on color characteristics of the peripheral equipment.

FIG. 19 is a diagram showing a data flow in a conventional color management system CMSj.

In the color management system CMSj shown in FIG. 19, color data CD1 outputted from an input device DV1 are subjected to color conversion, lightness characteristics conversion and various other conversion and adjustment, so that data after the conversion/adjustment are outputted to an output device DV2 as color data CD2.

The input device DV1 may be, for example, a scanner, a digital camera, a display or others. The color data (image data) CD1 handled in the input device DV1 are usually RGB color system data (RGB data) that represent colors using three primary colors of R (red), G (green) and B (blue). The color data CD1 outputted from the input device DV1 are data depending on (or subordinating to) a color characteristic unique to the input device DV1.

The output device DV2 may be, for example, a printer or others. The color data (image data) CD2 handled in the output device DV2 are usually CMYK color system data (CMYK data) that represent colors using four colors (three primary colors plus black) of C (cyan), M (magenta), Y (yellow) and K (black). It is necessary to create the color data CD2 outputted to the output device DV2 so as to reflect a color characteristic unique to the output device DV2. In this regard, it can be also said that the color data CD2 are data depending on the output device DV2.

Thus, the input device DV1 and the output device DV2 differ from each other in a color system of color data CD to be handled. In addition, the color data CD handled in each of the input device DV1 and the output device DV2 depend on a color characteristic of the device, namely, the color data CD are device-dependent. Accordingly, in the color management system CMSj, color data are subjected to color conversion from one color system to the other color system and differences of color characteristics are adjusted.

In the color management system CMSj, for example, an XYZ color system and an L*a*b* color system are used as color systems independent of the input and output devices, i.e., device-independent color systems. Device profiles that are prepared for the respective devices are referred to for conversion between color data CD depending on each of the devices and color data CE of a color system independent of each of the devices.

More specifically, with respect to the input device DV1, an input profile PF1j that is a device profile on the input side is referred to in order to convert the color data CD1 of an RGB color system into color data CE1 of the XYZ color system. With respect to the output device DV2, an output profile PF2j that is a device profile on the output side is referred to in order to convert color data CE2 of the L*a*b* color system (hereinafter, referred to as the Lab color system) into the color data CD2 of a CMYK color system. Profiles conforming to International Color Consortium (ICC), i.e., ICC profiles are generally used as those device profiles.

The input profile PF1j includes, for example, a one-dimensional look-up table LUT1 and a matrix MX1. The one-dimensional look-up table LUT1 serves to correct a lightness characteristic of the input device DV1. The matrix MX1 is a group of coefficients for arithmetic expressions or operations used for converting the corrected color data CD1 into the color data CE1 of the XYZ color system.

The output profile PF2j includes, for example, a one-dimensional look-up table LUT2, a three-dimensional look-up table LUT3 and a one-dimensional look-up table LUT4. The one-dimensional look-up tables LUT2 and LUT4 serve to adjust variation in lightness of the output device DV2 and contrast of an image. The three-dimensional look-up table LUT3 is a look-up table used for converting the color data CE2 of the Lab color system into the color data CD2 of the CMYK color system.

A color conversion portion CC1j performs a color conversion process of converting the color data CE1 of the XYZ color system into the color data CE2 of the Lab color system. Further, the color conversion portion CC1j performs gamut mapping GM before or after the color conversion XL. In the gamut mapping GM, mapping by a predetermined conversion method is so carried out that the color data CD2 fall within a range where color reproduction is possible by the output device DV2 (within a color gamut). As the conversion method of the gamut mapping GM, "perceptual", "preserving a relative color gamut", "preserving an absolute color gamut" and "saturation" are known.

The color conversion in the color management system CMSj, which is described above, is actually carried out by a color management module. More specifically, the color management module (CMM) uses the input profile PF1j and the output profile PF2j and performs color matching between the input device DV1 and the output device DV2 via a device-independent color space. On this occasion, the color management module integrates steps of a color conversion process including the input profile PF1j, the color conversion portion CC1j and the output profile PF2j into one device link profile in advance and uses the device link profile to convert color data CD1 to be inputted into color data CD2 directly. Profiles defined by the ICC mentioned above are used as such device link profiles.

Meanwhile, in a printer using a four-color material of CMYK, i.e., using four-color toner or ink, for example, even if inputted color data CD1 request "yellow (Y)", a small amount of color materials such as MYK usually happens to mix in a color material in addition to yellow. The same applies to cases of cyan and magenta.

Thus, in many cases, a small amount of other colors mixes even if a pure color is required. On this occasion, when an image to be printed is a photo image, no problems arise. However, when an image to be printed is a colored character or a solid color that is used in document-processing software, a small amount of mixed color material is conspicuous and the color becomes muddy, causing the image to be undesirable.

Accordingly, when a pure color such as "yellow", "cyan" or "magenta" is represented, mix of small amount of other color materials is eliminated and each of the pure colors is expressed by only one color material. In addition, when a pure color such as "red", "green" or "blue" is represented, the color is expressed by only a combination of two colors of "yellow" and "magenta", of "yellow" and "cyan" or of "magenta" and "cyan", respectively, and mix of small amount of other color materials is eliminated. In this way, a process is performed of representing color data using only one or two color materials, which is herein referred to as color purification or a color purification process.

According to a conventional color purification method described in Japanese unexamined patent publication No. 2002-152536, hue shift is performed on color data (a color signal) on an input side in a device-independent color space. Since the shift amount differs for each hue, a hue is shifted by an amount according to a hue of each piece of color data on the input side.

The conventional method mentioned above, however, assumes to use a certain particular input profile. Accordingly, the use of the above-described method by any other input profiles causes outputs to be unnatural.

When an output device is a printer, for example, a difference between a refined color and the surrounding colors that are not refined stands out in an image. As a difference between color spaces is larger, the color difference is greater, which increases the unnaturalness of outputs.

As a measure therefor, it is conceivable to understand differences between respective hues in color spaces of input devices and to prepare output profiles corresponding to respective input profiles. Stated differently, printer profiles are created and kept for one printer, the number of printer profiles being equal to the number of profiles of expected input devices.

In such a method, however, a color management module keeps many profiles for input devices, causing problems of requiring a considerable labor for creating the profiles and of requiring a large memory area for storing the profiles.

SUMMARY OF THE INVENTION

The present invention is directed to solve the problems pointed out above, and therefore, an object of the present invention is to provide a color conversion method and an image processor in which, in the case of color purification, images do not appear unnatural even by an input profile other than a certain particular input profile, no considerable labor is required for creating profiles and no large memory area is required for storing the profiles.

A color conversion method according to one aspect of the present invention is a method for performing color conversion on inputted color data to convert the inputted color data into color data having a color space different from that of the inputted color data. The color conversion method includes holding color space data in advance, the color space data being used for performing color conversion on color data having specific color space characteristics, comparing color space characteristics of the inputted color data with color space characteristics of the color space data that are held in advance, performing color conversion using gradation conversion data with respect to the inputted color data and color space data with respect to the inputted color data when a difference between the color space characteristics of the inputted color data and the color space characteristics of the color space data that are held in advance is a set threshold level or less, and performing color conversion using the gradation conversion data with respect to the inputted color data and the color space data that are held in advance when the difference between the color space characteristics of the inputted color data and the color space characteristics of the color space data that are held in advance is over the set threshold level.

Preferably, the gradation conversion data and the color space data with respect to the inputted color data are included in a device profile relating to the inputted color data.

Further, the color conversion includes a color purification process for outputting color data with a one-color material or a two-color material.

According to the device of the present invention, when a link profile is created, in a read profile on an input side, for example, a gamma value in which gradation characteristics are described is used as gradation conversion data without any change. Color space data such as a LUT (look-up table) or a matrix in which a color space is described are replaced with an LUT or a matrix that has specific color space characteristics preliminarily created by correction.

Further, as a profile on an output side, hue correction is performed or other correction process is performed in order to prevent discontinuity of colors at the time of color purification, for example. Then, a profile on which such a correction is performed is created and memorized in advance.

When color purification is performed, or when a difference between color space characteristics exceeds a set threshold value, the gradation conversion data and the color space data, which are mentioned above, are used to create a link profile.

A link profile thus created is used for color conversion and a color purification process.

According to the present invention, in the case of color purification, images do not appear unnatural even by an input profile other than a certain particular input profile, no considerable labor is required for creating profiles and no large memory area is required for storing the profiles.

These and other characteristics and objects of the present invention will become more apparent by the following descriptions of preferred embodiments with reference to drawings.

BRIEF DESCRIPTION OF THE DRAWINGS

FIG. 9 shows an example of a multidimensional look-up table.

FIG. 11 shows another example of a multidimensional look-up table.

FIG. 12 shows an example of a multidimensional look-up table subjected to a color purification process.

DESCRIPTION OF THE PREFERRED EMBODIMENTS

[First Embodiment]

Figure 1:
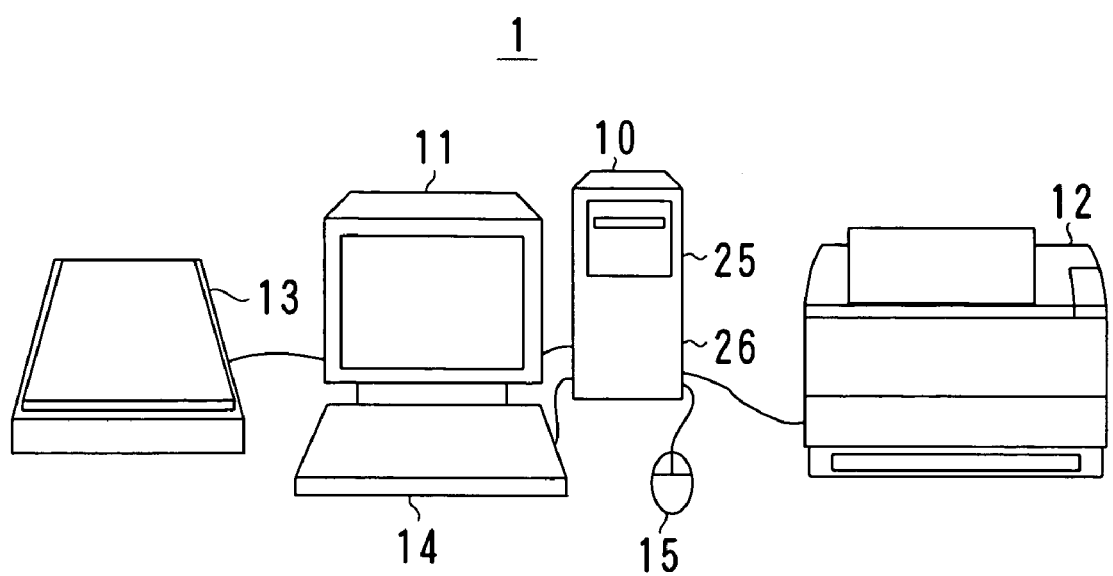
FIG. 1 is a diagram showing a general appearance of an image processing system according to the present invention.
Figure 2:
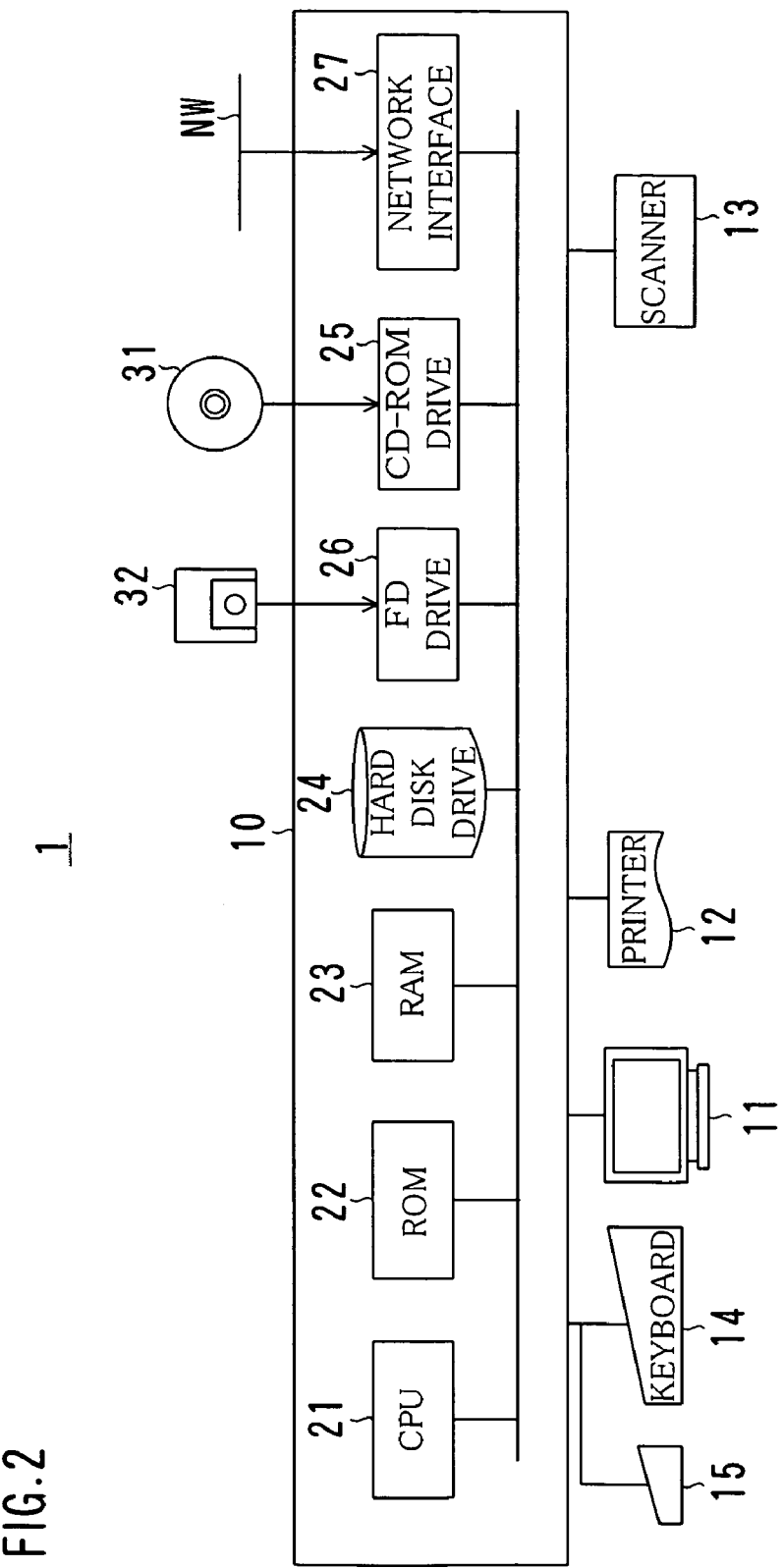
FIG. 2 is a block diagram showing a structure of the image processing system.

FIG. 1 is a diagram showing a general appearance of an image processing system 1 according to the present invention and FIG. 2 is a block diagram showing a structure of the image processing system 1.

As shown in FIG. 1, the image processing system 1 includes a main unit 10, a display 11, a printer 12, a scanner 13, a keyboard 14 and a mouse 15.

As shown in FIG. 2, the main unit 10 includes a CPU 21, a ROM 22, a RAM 23, a hard disk drive 24, a CD-ROM (Compact Disk Read-Only Memory) drive 25, a FD (Flexible Disk) drive 26 and a network interface 27. These elements or devices included in the main unit 10 are connected to each other via an appropriate bus or interface.

The ROM 22 memorizes a boot-up program for an operating system or others. The RAM 23 reads programs executed by the CPU 21 to memorize the same. The RAM 23 also reads various data, files, tables and the like to temporarily memorize the same during execution of a program, and is used as a work area in processing. The hard disk drive 24 memorizes programs, data or others. A CD-ROM 31 is inserted into the CD-ROM drive 25 and a FD 32 is inserted into the FD drive 26 for access according to need. The network interface 27 serves to connect the main unit 10 to a network NW.

The main unit 10 can be a prevailing personal computer.

The hard disk drive 24 memorizes respective profiles (device profiles) of the display 11, the printer 12 and the scanner 13.

Each of the profiles may be inputted from each of the devices to the main unit 10. Alternatively, profiles recorded in the CD-ROM 31 or the FD 32 may be inputted from the CD-ROM drive 25 or the FD drive 26 to the main unit 10. In addition, profiles may be inputted from another printer or device such as a computer that is connected to the network NW to the main unit 10 via the network interface 27. The profiles are associated with the devices from where the profiles are outputted to be memorized in the hard disk drive 24.

Each of the profiles of the display 11 and the scanner 13 can be an input profile PF1. Each of the profiles of the printer 12 and the display 11 can be an output profile PF2.

In the first embodiment, the CPU 21 executes a link file creation program, so that the main unit 10 links the input profile PF1, the output profile PF2 or others to create a link profile LP1. The link profile LP1 thus created is memorized in the RAM 23 or the hard disk drive 24.

Generally, various programs including a link creation program are stored in a recording medium such as the CD-ROM 31 or the FD 32 for distribution. Then, the various programs are read out from the recording medium using the CD-ROM drive 25 or the FD drive 26, to be temporarily stored in the hard disk drive 24. Further, the various programs are read out from the hard disk drive 24 into the RAM 23, so that the programs are executed by the CPU 21.

Note that the recording medium can be a magnetic tape, a cassette tape, an optical disk, a magneto-optical disk or a semiconductor memory such as an IC card, an optical card, a mask ROM, an EPROM, an EEPROM or a flash ROM. The various programs include a program in a source program format, a compressed program, an encrypted program in addition to programs that can be directly executed by the CPU 21.

In an operation example according to the first embodiment, the display 11 is used as an input device, while the printer 12 is used as an output device.

More specifically, for example, a user makes the main unit 10 execute a drawing program, operates the keyboard 14 or the mouse 15 to create image data while seeing an image displayed on the display 11, and uses the image data thus created as input image data (color data). Then, the image is printed on a sheet of paper by the printer 12.

In such a case, in the main unit 10, the profile of the display 11 is used as an input profile PF1 and the profile of the printer 12 is used as an output profile PF2. A link profile LP1 is created based on the input profile PF1 and the output profile PF2.

In another operation example, color data are inputted using various devices and profiles, or color data are received and inputted from another equipment. Then, the inputted color data are subjected to a color conversion process and the converted color data are displayed or printed by various devices or transmitted to another equipment.

Figure 3:
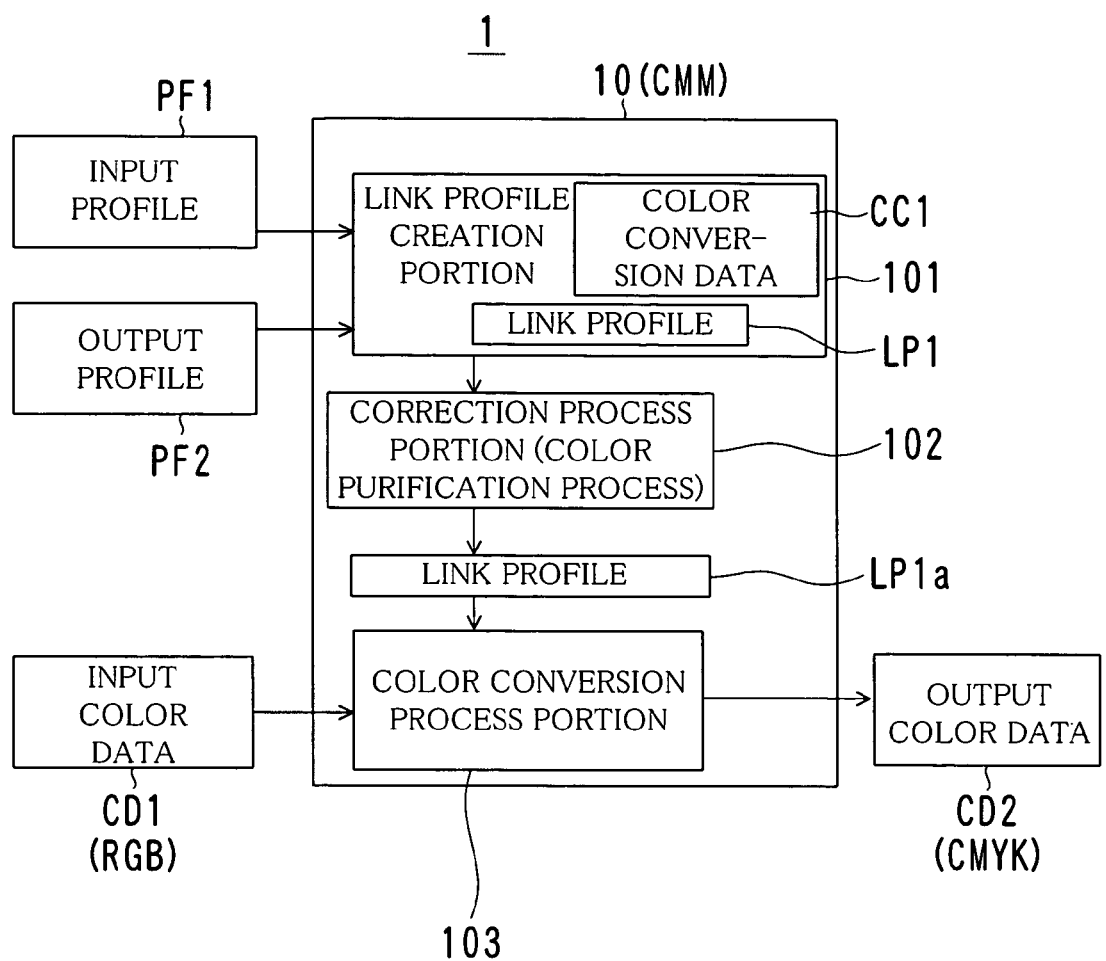
FIG. 3 is a block diagram showing functions of the image processing system according to a first embodiment.
Figure 4:
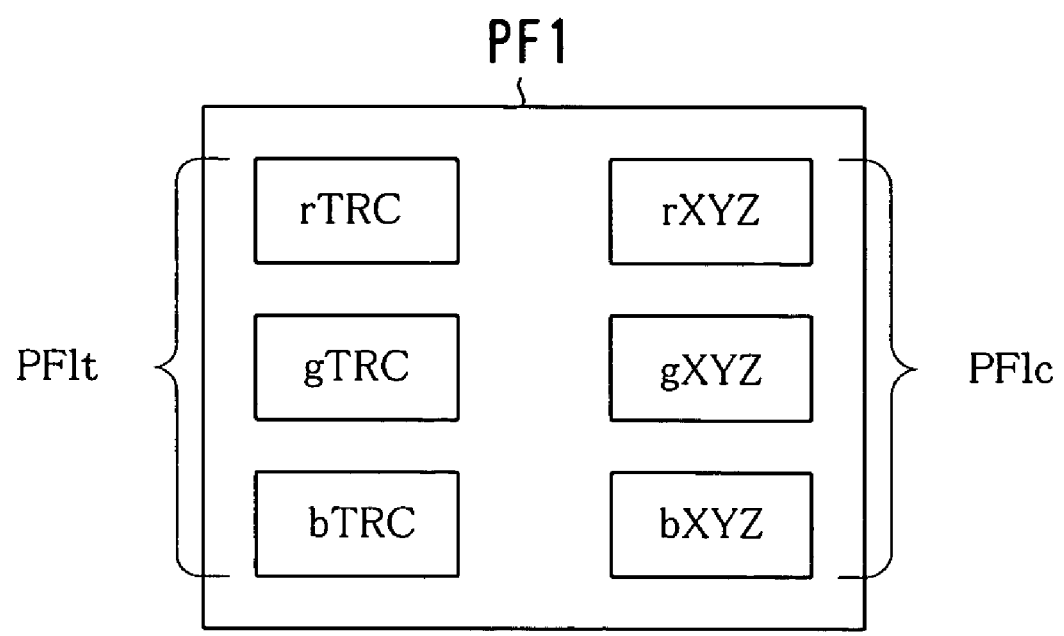
FIG. 4 shows an example of an input profile.
Figure 5:
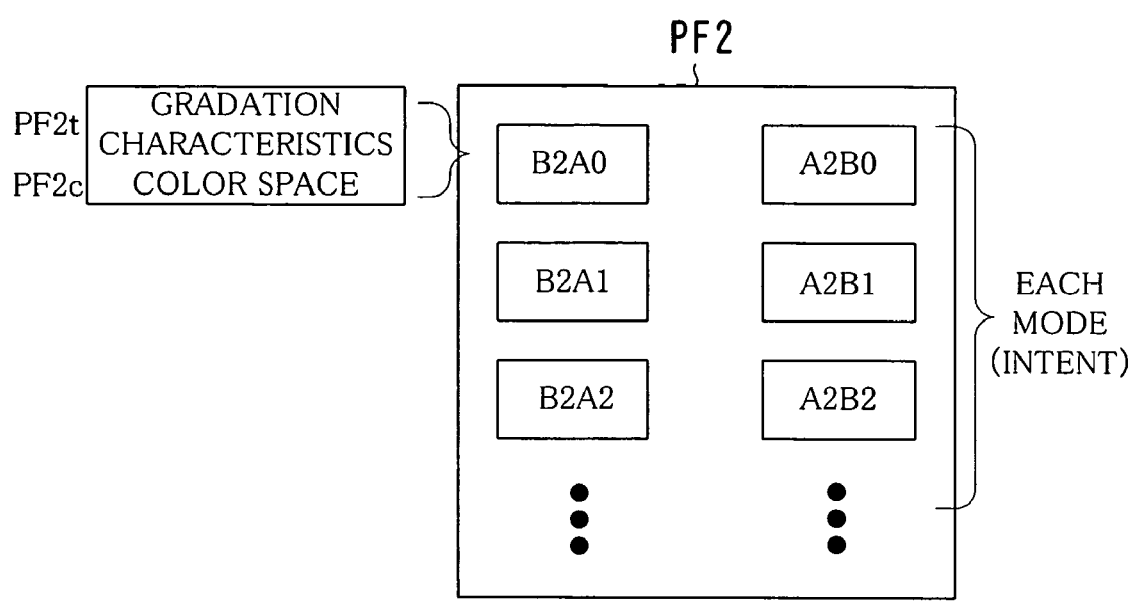
FIG. 5 shows an example of an output profile.
Figure 6:
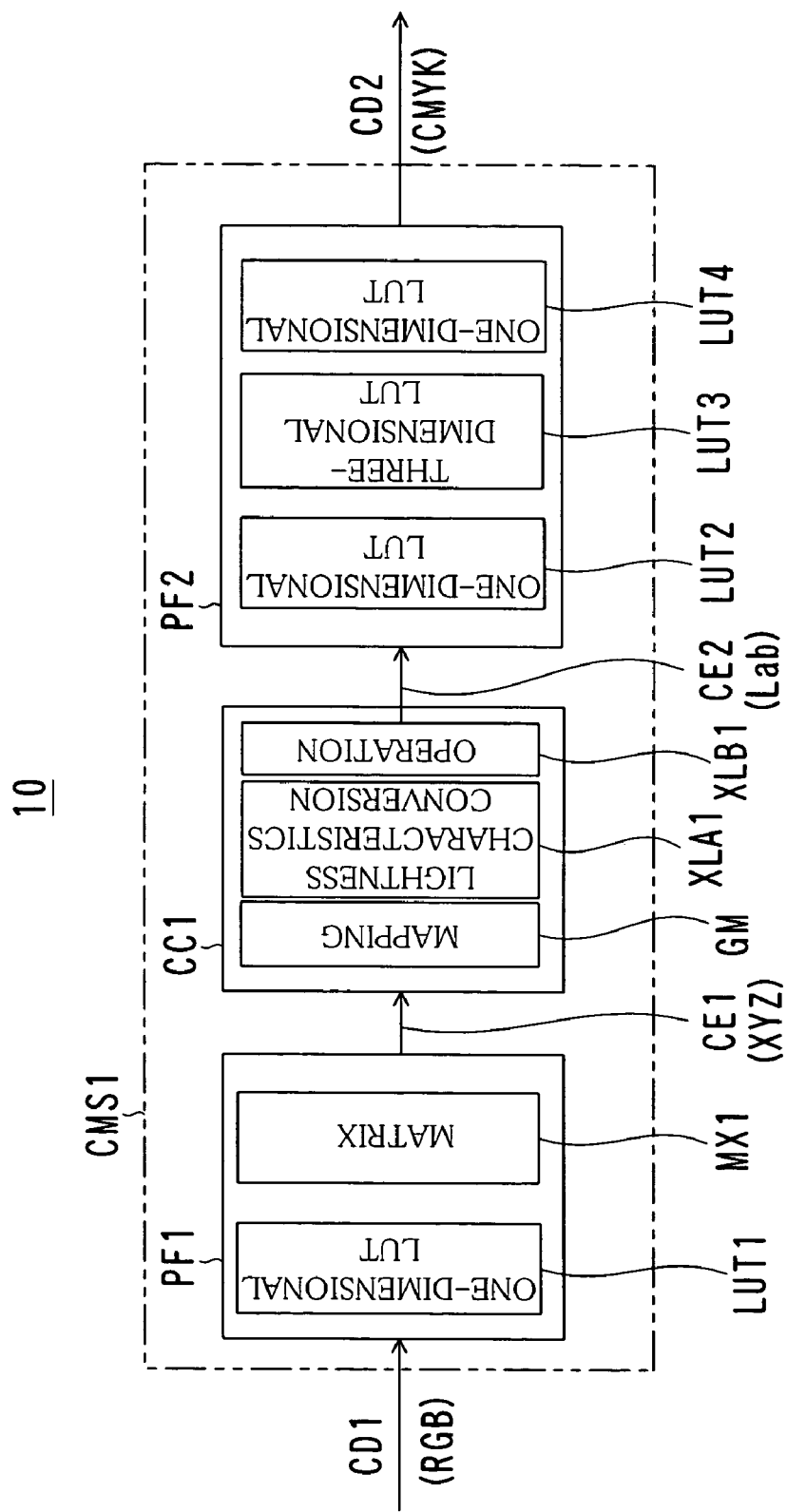
FIG. 6 is a diagram showing an example of functions of a color management system in a main unit.
Figure 7:
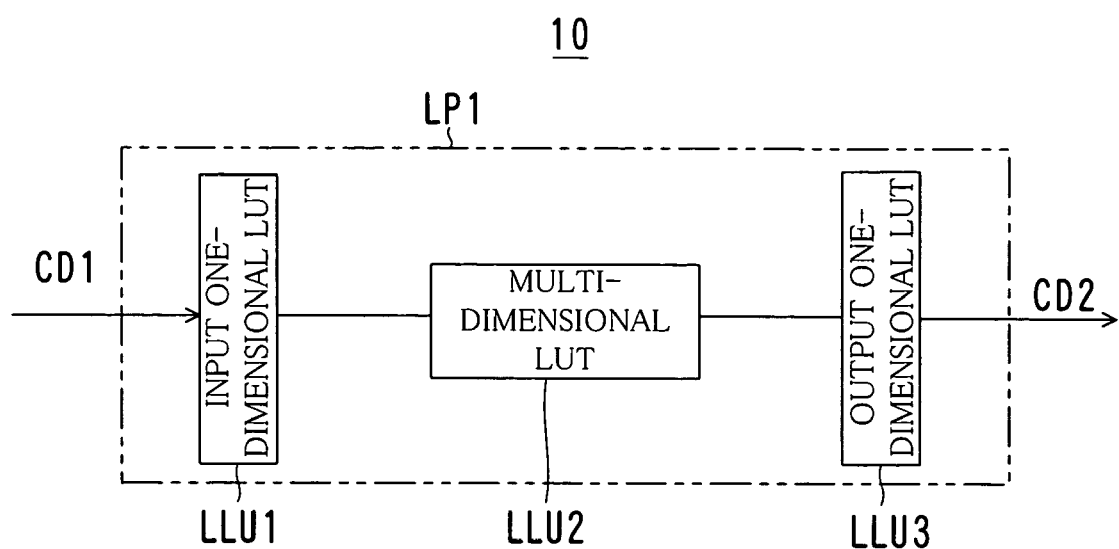
FIG. 7 is a diagram showing an example of a structure of a link profile.
Figure 8:
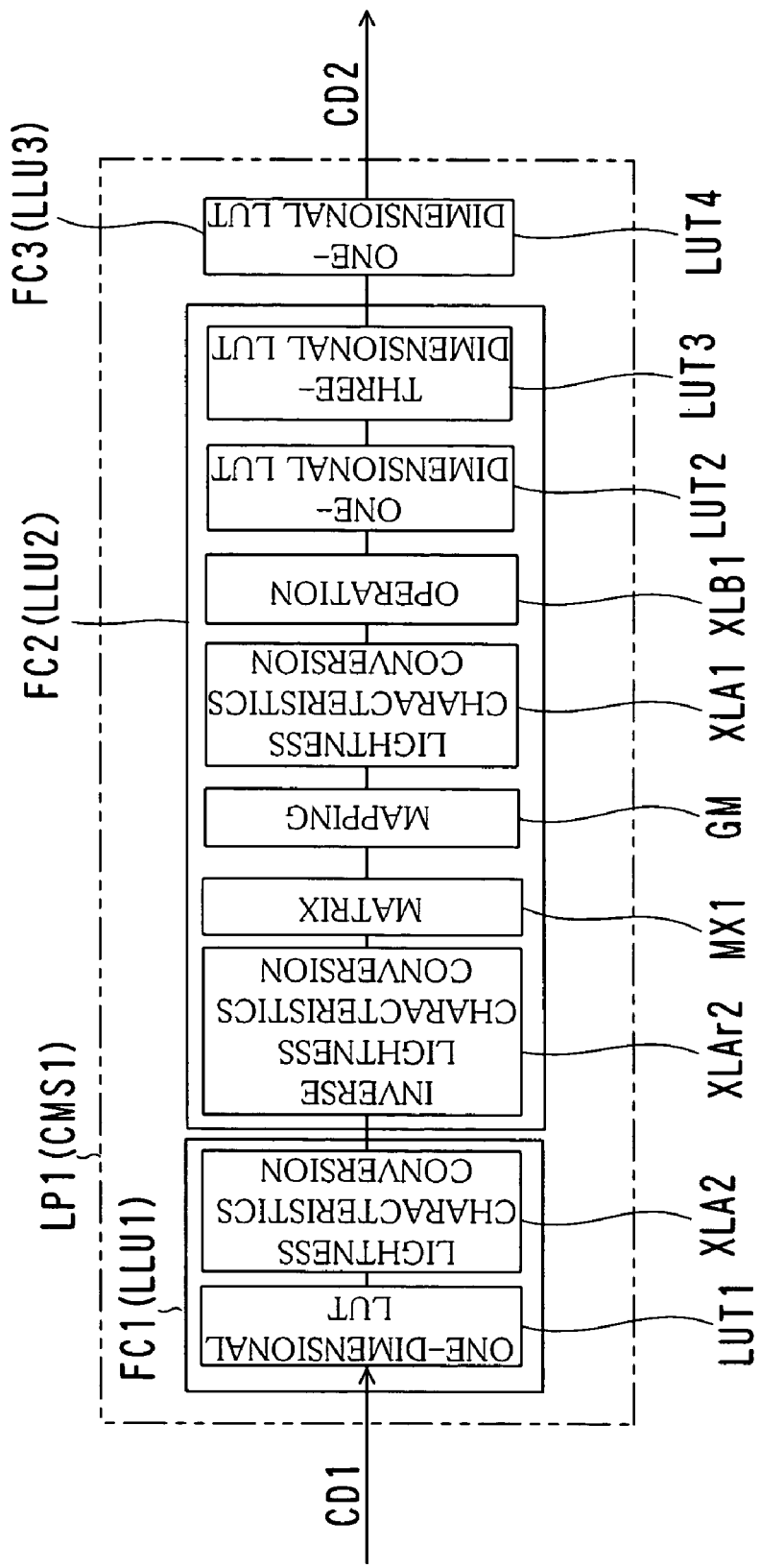
FIG. 8 is a diagram showing another example of functions of a link profile.
Figure 10:
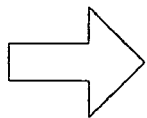
FIG. 10 is a diagram showing an example of a color purification process.
Figure 13:
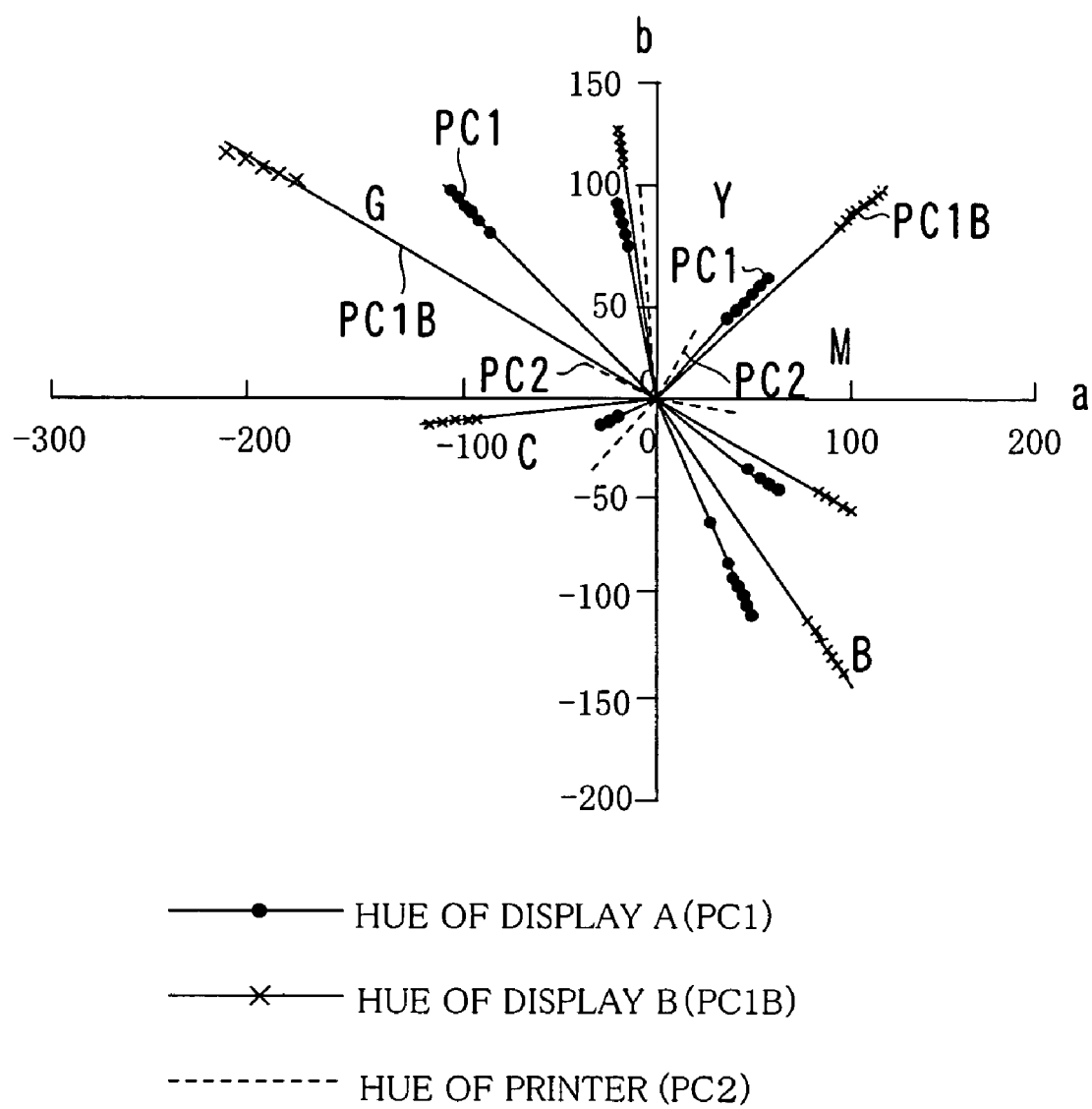
FIG. 13 is an explanatory diagram of hue shift in a color space of a Lab color system.

FIG. 3 is a block diagram showing functions of the image processing system 1 according to the first embodiment, FIG. 4 shows an example of the input profile PF1, FIG. 5 shows an example of the output profile PF2, FIG. 6 is a diagram showing an example of functions of a color management system CMS1 in the main unit 10, FIG. 7 is a diagram showing an example of a structure of the link profile LP1, FIG. 8 is a diagram showing another example of functions of the link profile LP1, FIG. 9 shows an example of a multidimensional look-up table LLU2, FIG. 10 is a diagram showing an example of a color purification process, FIG. 11 shows another example of a multidimensional look-up table LLU2A, FIG. 12 shows an example of a multidimensional look-up table LLU2B subjected to a color purification process, and FIG. 13 is an explanatory diagram of hue shift in a color space of a Lab color system.

Referring to FIG. 3, the main unit 10 is provided with a link profile creation portion 101, a correction process portion 102, a color conversion process portion 103 and color conversion data CC1. In addition, the input profile PF1 and the output profile PF2 are read into the main unit 10 so as to be temporarily memorized in the RAM 23 provided in the main unit, or the like.

As shown in FIG. 4, in the input profile PF1 is described gradation characteristics PF1t of RGB values of the display 11 and a color space PF1c of an XYZ color system displayed on the display 11. Note that, in FIG. 4, the gradation characteristics PF1t are shown by a redTRC (TRC is an abbreviation for a Tone Reproduction Curve), a greenTRC and a blueTRC. More specifically, the gradation characteristics PF1t are described in the form of gamma value, one-dimensional LUT or others.

As shown in FIG. 5, in the output profile PF2 is described gradation characteristics PF2t of the printer 12 and a color space PF2c printed by the printer 12 so that the gradation characteristics PF2t and the color space PF2c correspond to each output mode (intent). The output modes include a picture mode for printing a picture image or a picture area and a business mode for printing an image or a figure with computer graphics. The color space of each of the output modes is described in the form of look-up table, matrix or others.

The link profile creation portion 101 refers to the input profile PF1, the output profile PF2, the color conversion data CC1 and others to create the link profile LP1. The link profile LP1 thus created is memorized in an appropriate area of a memory. A process of creating the link profile LP1 by the link profile creation portion 101 will be explained in detail later. The correction process portion 102 performs correction such as color purification on the created link profile LP1 to output a corrected link profile LP1a.

An image displayed on the display 11 becomes input color data CD1 of an RGB color system and the input color data CD1 are inputted to the main unit 10. The color conversion process portion 103 refers to the link profile LP1a to convert the input color data CD1 into output color data CD2 of a CMYK color system. The output color data CD2 are outputted to the printer 12 that prints the output color data CD2.

The CPU 21 executes a link file generation program, so that the processes and functions in the main unit 10 described above are realized. Such a program is provided as, for example, a color management module (CMM). It is possible to replace a part of the color management module with a hardware circuit.

Referring to FIG. 6, in the color management system CMS1 in the main unit 10, the color data CD1 are subjected to color conversion, lightness characteristics conversion and various conversion or adjustments that are performed using the input profile PF1, the color conversion data CC1 and the output profile PF2, so that the color data CD1 are outputted as the color data CD2. The general function of the color management system CMS1, i.e., the general process contents for the color data CD1 are similar to the case of the color management system CMSj shown in FIG. 19.

More specifically, in the first embodiment, the input profile PF1 includes a one-dimensional look-up table LUT1 and a matrix MX1, similarly to the input profile PF1j described with reference to FIG. 19.

The one-dimensional look-up table LUT1 serves to correct lightness characteristics (gradation characteristics) of the display 11 as an input device. The matrix MX1 is a matrix in which colors of the RGB color system unique to the display 11 (dependent colors) are associated with device-independent colors of the XYZ color system (independent colors). In other words, the matrix MX1 is a group of coefficients for arithmetic expressions or operations used for converting the corrected color data CD1 into color data CE1 of the XYZ color system.

Similarly to the output profile PF2j described with reference to FIG. 19, the output profile PF2 includes a one-dimensional look-up table LUT2, a three-dimensional look-up table LUT3 and a one-dimensional look-up table LUT4.

The one-dimensional look-up tables LUT2 and LUT4 serve to adjust variation in density of the printer 12 as an output device and contrast of an image. The three-dimensional look-up table LUT3 is a look-up table in which colors of the CMYK color system unique to the printer 12 (dependent colors) are associated with device-independent colors of the Lab color system (independent colors). In other words, the three-dimensional look-up table LUT3 is used for converting color data CE2 of the Lab color system into the color data CD2 of the CMYK color system.

Note that color spaces depending on devices, e.g., color spaces of the RGB color system and the CMYK color system, and a color space of the XYZ color system and the like are uneven color spaces, while a color space designed to be even with respect to human perception, e.g., a color space of the Lab color system is an even color space.

Figure 19:
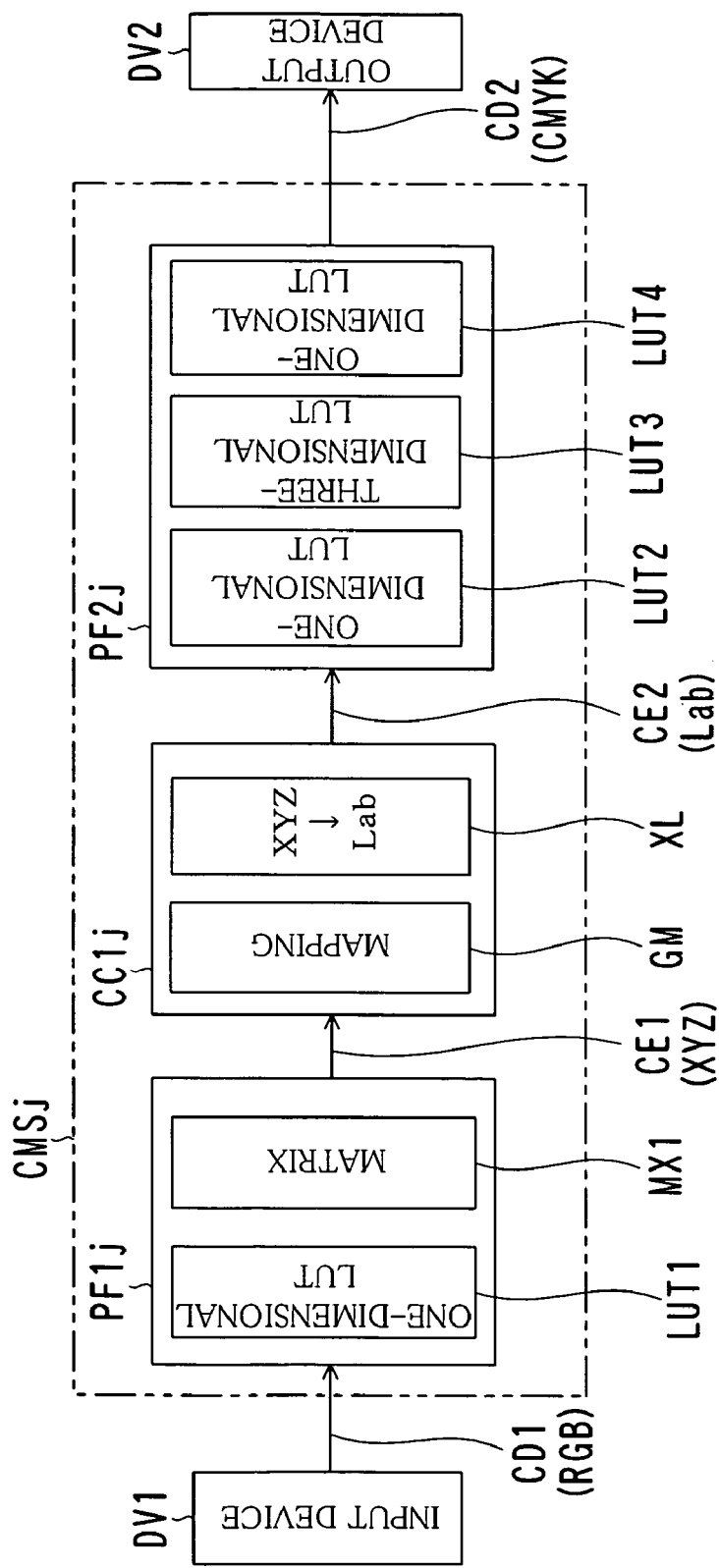
FIG. 19 is a diagram showing a data flow in a conventional color management system.

The color conversion data CC1 has a function equivalent to the color conversion portion CC1j shown in FIG. 19. The color conversion data CC1 include data or arithmetic expressions for performing color conversion from the color data CE1 of the XYZ color system into the color data CE2 of the Lab color system and data or arithmetic expressions used for the gamut mapping GM.

In the color conversion data CC1 according to the first embodiment, however, data or arithmetic expressions for the color conversion XL are separated into lightness characteristics conversion XLA1 and an operation XLB1, as shown in FIG. 4.

More particularly, conversion from each value of XYZ into each value of Lab is designated by the following equation (1).

$$L=116(Y)^{1/3}-16$$

$$a=500(X^{1/3}-Y^{1/3}) \quad (1)$$

$$b=200(Y^{1/3}-Z^{1/3})$$

Here, terms of $X^{1/3}$, $Y^{1/3}$, and $Z^{1/3}$ shown in the equation (1) are defined as functions of X, Y and Z respectively and are designated by the following equation (2).

$$f(X)=X^{1/3}$$

$$f(Y)=Y^{1/3} \quad (2)$$

$$f(Z)=Z^{1/3}$$

Then, the equation (1) can be rewritten to the following equation (3).

$$L=116 \times f(Y)-16$$

$$a=500 \times [f(X)-f(Y)] \quad (3)$$

$$b=200 \times [f(Y)-f(Z)]$$

Then, conversion defined by the equation (2) is made the lightness characteristics conversion XLA1 and conversion defined by the equation (3) is made the operation XLB1. In the lightness characteristics conversion XLA1, a cube root value of an input value Y is an output value f(Y). Thus, in the lightness characteristics conversion XLA1, XYZ values are converted into linear values with respect to "L" of the Lab color system having lightness that is close to sense perceived by human being (vision).

Strictly, contents of the function f(Y) differ as follows, depending on a range of Y.

When Y is more than 0.008856, $f(Y)=Y^{1/3}$, while when Y is 0.008856 or less, $f(Y)=7.787 \times Y + 16/116$.

The link profile creation portion 101 generates a link profile LP1 based on the functions shown in FIG. 4. On this occasion, the functions shown in FIG. 4 are divided into three portions. For example, the one-dimensional look-up table LUT1 of the input profile PF1 is made a first function portion FC1, the one-dimensional look-up table LUT4 of the output profile PF2 is made a third function portion FC3 and a middle part other than the first function portion FC1 and the third function portion FC3 is made a second function portion FC2. As shown in FIG. 7, an input one-dimensional look-up table LLU1, a multi-dimensional look-up table LLU2 and an output one-dimensional look-up table LLU3 are so created that the three function portions FC1, FC2 and FC3 become the tables LLU1, LLU2 and LLU3, respectively.

Note that, as shown in FIG. 8, it is possible to insert lightness characteristics conversion XLA2 having the same function as the lightness characteristics conversion XLA1 into the first function portion FC1 and to insert inverse lightness characteristics conversion XLAr2 that is inverse conversion of the lightness characteristics conversion XLA2 into the second function portion FC2.

In such a case, the inverse lightness characteristics conversion XLAr2 is first applied to the multi-dimensional look-up table LLU2 and the inverse lightness characteristics conversion XLAr2 is included and combined to become the multi-dimensional look-up table LLU2. Accordingly, inside the multi-dimensional look-up table LLU2, inverse lightness characteristics of the inverse lightness characteristics conversion XLAr2 and lightness characteristics of the lightness characteristics conversion XLA1 are cancelled each other, so that the relationship between an input and an output of the multi-dimensional look-up table LLU2 becomes closer to a linear relationship (a primary relationship). Thereby, a relationship between a pitch of values on an input side and a pitch of values on an output side in the multi-dimensional look-up table LLU2 becomes approximately equal, ensuring that satisfactory accuracy can be obtained when an interpolation operation is used to determine a value of color data to be outputted based on a value of inputted color data, so that interpolation accuracy can be enhanced. Further, in many cases, an interpolation operation is performed in a color space close to visual characteristics of human being, and therefore, color conversion can be performed which puts emphasis on a color area sensitive to human vision.

Note that various known methods can be used to create each of the tables LLU1, LLU2 and LLU3. For example, data having various values are inputted to each of the function portions FC1, FC2 and FC3, output values with respect to the respective inputs are determined by an operation and the determined output values are recorded. Then, the input values and the output values of the respective function portions FC1, FC2 and FC3 are recorded in the form of look-up table. On such an occasion, as the input values and the output values, a range between the minimum value and the maximum value may be divided into appropriate steps to obtain the appropriate number of data. When the multi-dimensional look-up table LLU2 is created, for example, each value of RGB values as inputs is divided into 16 steps. Then, lattice point numbers from $1^{st}$ to $17^{th}$ are assigned to each of RGB so that CMYK values as outputs may be obtained for each of combinations of the lattice points. In such a case, the number of data is 17×17×17.

In this case, since the number of data of the multi-dimensional look-up table LLU2 is finite, there are no data having exactly the same value as color data to be inputted in many cases. In such a case, a value of color data to be outputted is determined by an interpolation operation.

FIG. 9 shows the multi-dimensional look-up table LLU2 having 17×17×17 data, the table being created as stated above. This multi-dimensional look-up table LLU2 shows each density of RGB in 256 gradations and records data in steps of 16 gradations. CMYK data corresponding to respective lattice points of RGB can be obtained using the multi-dimensional look-up table LLU2.

FIG. 11 shows a part of the multi-dimensional look-up table LLU2. More specifically, the multi-dimensional look-up table LLU2A shown in FIG. 11 shows CMYK values corresponding to RGB data of lattice points on a hue line from R (red) to W (white).

Referring to the multi-dimensional look-up table LLU2A shown in FIG. 11, all data whose lattice point number is 1 to 17 have a constant R value of "255", which is the maximum value, and have G and B values ranging from "0" to "255". With respect to these RGB values, CMYK values are determined by an operation to be recorded.

Next, color purification in the correction process portion 102 is described.

Referring to FIG. 10, concerning light yellow, i.e., RGB values of (R, G, B)=(255, 255, 192) of a lattice point, in the multi-dimensional look-up table LLU2 shown in FIG. 9, the corresponding CMYK values are (C, M, Y, K)=(3, 4, 86, 1). This CMYK values include components other than yellow components. Printing is performed by the printer 12 using the CMYK values without any change, ending up being muddy yellow. In order to avoid that prospect, the components other than yellow are made "zero" to change the CMYK values to (C, M, Y, K)=(0, 0, 94, 0). In other words, in response to the lattice point of (R, G, B)=(255, 255, 192), the CMYK values are rewritten to (C, M, Y, K)=(0, 0, 94, 0). Here, the value of yellow (Y) increases. This is because the components other than yellow are added to yellow in order to avoid change of density before and after the rewriting. Such a process is performed on other lattice points representing yellow and lattice points representing cyan, magenta, red, green and blue respectively.

The multidimensional look-up table LLU2B shown in FIG. 12 is a table created by performing a color purification process on the multi-dimensional look-up table LLU2A shown in FIG. 11.

When a multidimensional look-up table LLU2a in which such a color purification process is performed internally is used, each of the six colors mentioned above is outputted in a bright and refined color excluding other components.

In the case of the color purification, however, when further processes are not performed, a color gap is generated between a portion where color purification is performed and the surrounding portion, leading to no continuity as colors in some cases. More particularly, in the case of continuous change of colors, since only a portion corresponding to a pure color is subjected to color purification, colors are discontinuous at the portion. In other words, colors are intermittent at the portion, resulting in an unnatural image. In order to prevent this situation, a hue of color data on an input side is shifted. Color data are moved, for example, in a color space of the Lab color system. Shift amount of color data depends on each hue. Stated differently, each piece of color data on an input side is moved by suitable amount corresponding to each hue.

Referring to FIG. 13, filled circles denote a hue PC1 of each color of the display 11 in a Lab space. The display 11 in this case is called a display A. Broken lines denote a hue PC2 of each color of the printer 12 in the same Lab space.

Here, the hue PC1 of the display 11 is obtained by converting a color space thereof into the Lab color space based on the input profile PF1, while the hue PC2 of the printer 12 is obtained by converting a color space thereof into the Lab color space based on the output profile PF2.

As clearly shown in FIG. 13, the hue PC1 of the display 11 and the hue PC2 of the printer 12 do not correspond to each other in the Lab space. Accordingly, in order to maintain continuity of colors at the time of color purification, correction is so required that the hue PC1 coincides with the hue PC2. For that purpose, for example, the hue PC2 of the printer 12, with respect to each color (r, g, b, Y, M or C), is rotated in the Lab space for movement so that the colors (r, g, b, Y, M and C) respectively overlap with the corresponding colors of the hue PC1 of the display 11. In such a case, the shift amount is specified by a rotation angle of the hue PC2 with respect to each color of the printer 12.

Note that this method for correcting a hue is known. For example, Japanese unexamined patent publication No. 2002-152536 mentioned above; especially description at paragraph 0041 can be referred to.

Shift amount of a hue of each color, i.e., contents of the correction process are unique to each input device. More particularly, the hue PC1 of the display A differs from a hue PC1B of another display B, as shown in FIG. 13. Accordingly, contents of the correction process depend on each input device. On that account, it is necessary to perform the correction process discussed above individually for each input device to be used.

For example, supposing that correction contents are derived for each profile of various types of displays 11 and the profile of the printer 12 is corrected, this problem is supposedly solved. In the correction process, however, a work of determining shift amount of each color by way of experiment is required and the work involves much time and effort. In short, a labor for deriving correction contents is significantly large. In addition, a large memory area is necessary to memorize corrected profiles.

However, if color purification is carried out without performing the correction process mentioned above, in some cases, colors are discontinuous and an image becomes unnatural.

In the first embodiment, this problem is solved by the following procedure.

Figure 14:
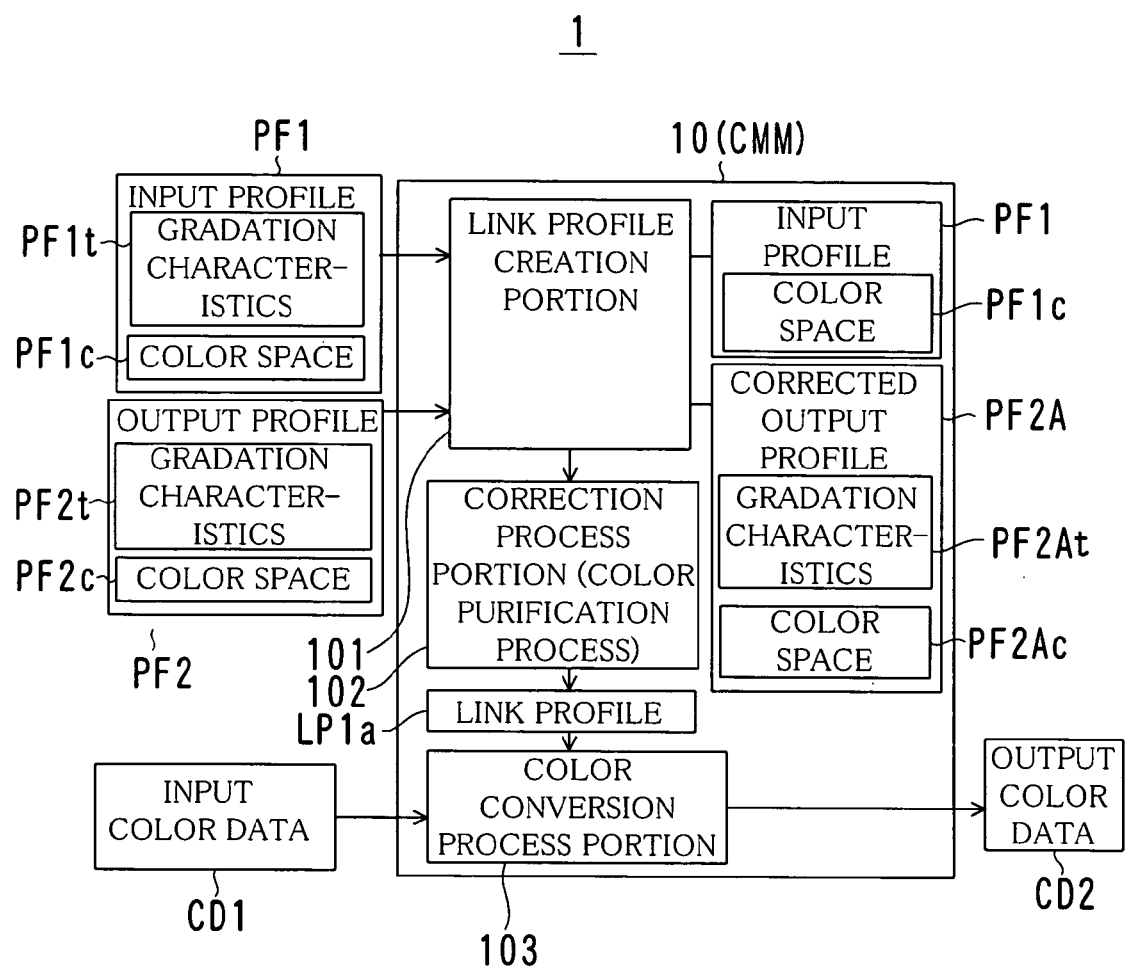
FIG. 14 is a block diagram showing functions in a preparatory stage of a color conversion process.
Figure 15:
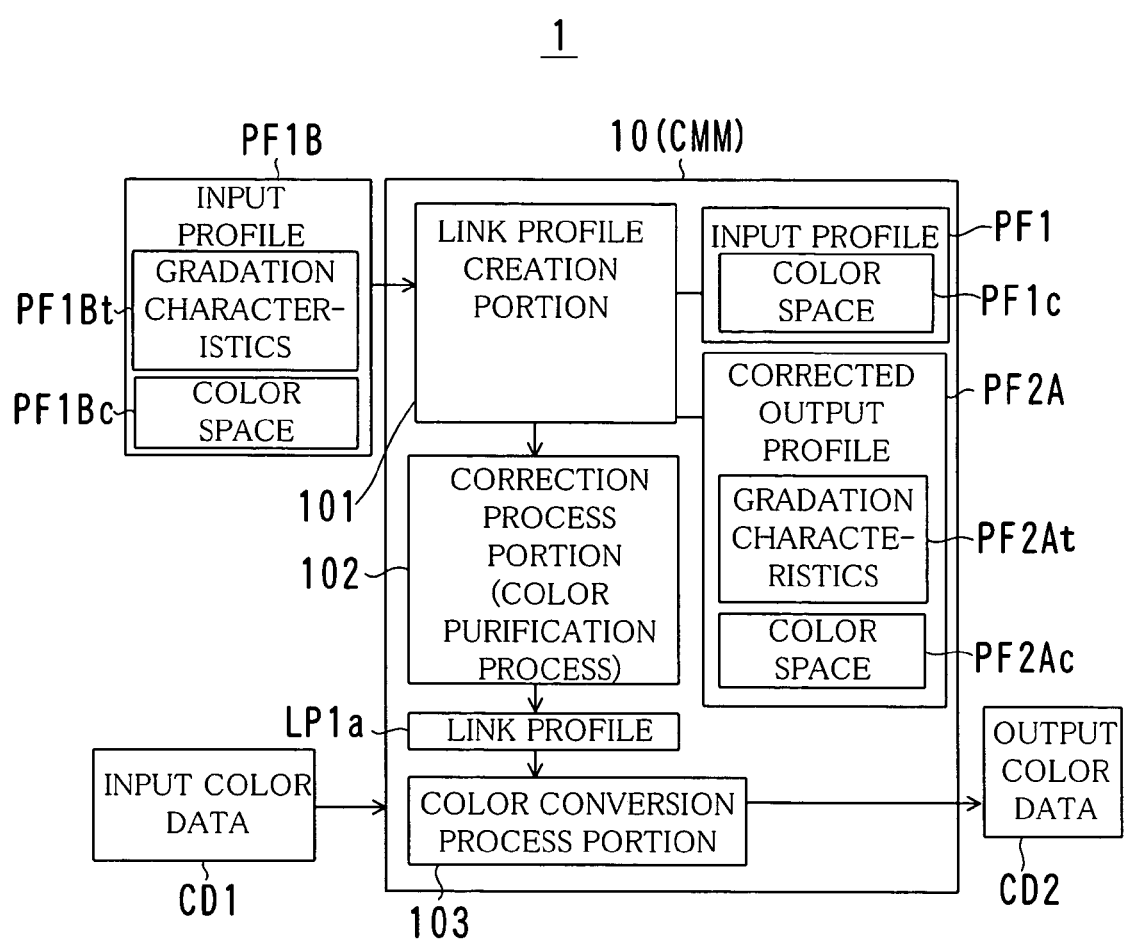
FIG. 15 is a block diagram showing functions in an execution stage of the color conversion process.

FIG. 14 is a block diagram showing functions in a preparatory stage of a color conversion process and FIG. 15 is a block diagram showing functions in an execution stage of the color conversion process.

First, a process in the preparatory stage is performed. Referring to FIG. 14, the input profile PF1 includes the gradation characteristics PF1t and the color space PF1c. The output profile PF2 includes the gradation characteristics PF2t and the color space PF2c. When the input profile PF1 and the output profile PF2 are read into a color management module (the main unit 10), the correction process described above is performed.

More specifically, a process is performed of rotating the hue PC2 so as to coincide with the hue PC1 of each color of the profile of the display 11 (the input profile PF1) on the profile of the printer 12 (the output profile PF2). Such a correction process is performed, so that corrected output profile PF2A is created and memorized in an adequate memory area. The corrected output profile PF2A includes corrected gradation characteristics PF2At and a corrected color space PF2Ac. Concerning the input profile PF1, the color space PF1c thereof is memorized in an adequate memory area of the color management module.

Next, a process in the execution stage is performed. Referring to FIG. 15, an input profile PF1B differing from the input profile PF1 shown in FIG. 14 is read. This input profile PF1B includes gradation characteristics PF1Bt and a color space PF1Bc. Only the gradation characteristics PF1Bt are used for creation of the link profile LP1.

More particularly, the link profile creation portion 101 generates the link profile LP1 using the gradation characteristics PF1Bt of the input profile PF1B read as mentioned above, the color space PF1c memorized in advance and the gradation characteristics PF2At as well as the color space PF2Ac of the corrected output profile PF2A.

Then, in the correction process portion 102, a color purification process or the like is performed on the link profile LP1. In the color conversion process portion 103, the corrected link profile LP1a is used to convert the input color data CD1 into the output color data CD2. At the time of the conversion, an interpolation operation is performed, if necessary. The printer 12 prints out an image based on the output color data CD2.

In this way, the color space PF1c preliminarily memorized and the color space PF2Ac of the corrected output profile PF2A are used when the link profile LP1 is created. Thereby, continuity of colors is maintained after the color purification. In addition, since the gradation characteristics PF1Bt of the read input profile PF1B are used, gradation characteristics of an input device corresponding to the input profile PF1B are taken advantage, so that an appearance of an image by the input device coincides with an appearance of an image printed by the printer 12.

Accordingly, even when any kind of display is used as an input device, bright colors of color materials are realized by the color purification and an inherent effect of a color purification process, i.e., reproducibility of gradations is obtained. Additionally, since continuity of colors is maintained at the vicinity of a portion subjected to color purification, unnaturalness of color differences is eliminated between the portion where color purification is performed and a portion where no color purification is performed. Further, the gradation characteristics PF1Bt of an input device to be used are utilized without any change, and therefore, an appearance of an image is common to the input device and an output device.

Moreover, only memorization of the color space PF1c and the corrected output profile PF2A allows for support of profiles of most input devices, which eliminates the need for a much labor and a large memory area.

As described above, according to the first embodiment, it is sufficient that data for only the color space PF1c are kept in a color management module and a correction process is performed on the output profile PF2 that is read in advance. Accordingly, an execution speed in the color management module is hardly affected and an execution speed of a color conversion process seldom lowers.

In the correction process portion 102, the following correction is performed if required, in addition to the color purification.

For example, a correction process may be performed on lattice points on a hue line from B (blue) to K (black). In such a case, dependent colors of the printer 12 that are associated with RGB data of the lattice points on the hue line from B (blue) to K (black) are so corrected that a difference of variation in each color becomes small between successive dependent colors. This correction process is performed for each color.

More specifically, concerning a certain color A, for example, a data value of the lattice point number i before correction is made A(i) and a data value thereof after correction is made A'(i). Then, the data value thereof after correction A'(i) is derived from the following equation.

$$A'(i)=[A(i-1)+A(i)+A(i+1)]/3$$

Here, A(i−1) and A(i+1) are data values of the lattice point numbers (i−1) and (i+1) before correction.

Since lattice points to be processed are on a predetermined hue line, this correction process can minimize influence on accuracy in the case of an interpolation operation. Note that a correction process performed on lattice points on a hue line from W (white) to K (black) substantially corresponds to adjustment of a gray balance.

The multidimensional look-up table LLU2B on which the above-mentioned correction is performed by the correction process portion 102 is included in the link profile LP1a.

When other correction modes are set, a link profile LP1a on which a correction process corresponding to the set correction mode is performed is outputted. When a mode is not a correction mode, no correction process is performed on the link profile LP1 and the link profile LP1 is made a link profile LP1a without any change.

Next, a flow of a color conversion process in the image processing system 1 is described with reference to flowcharts.

Figure 16:
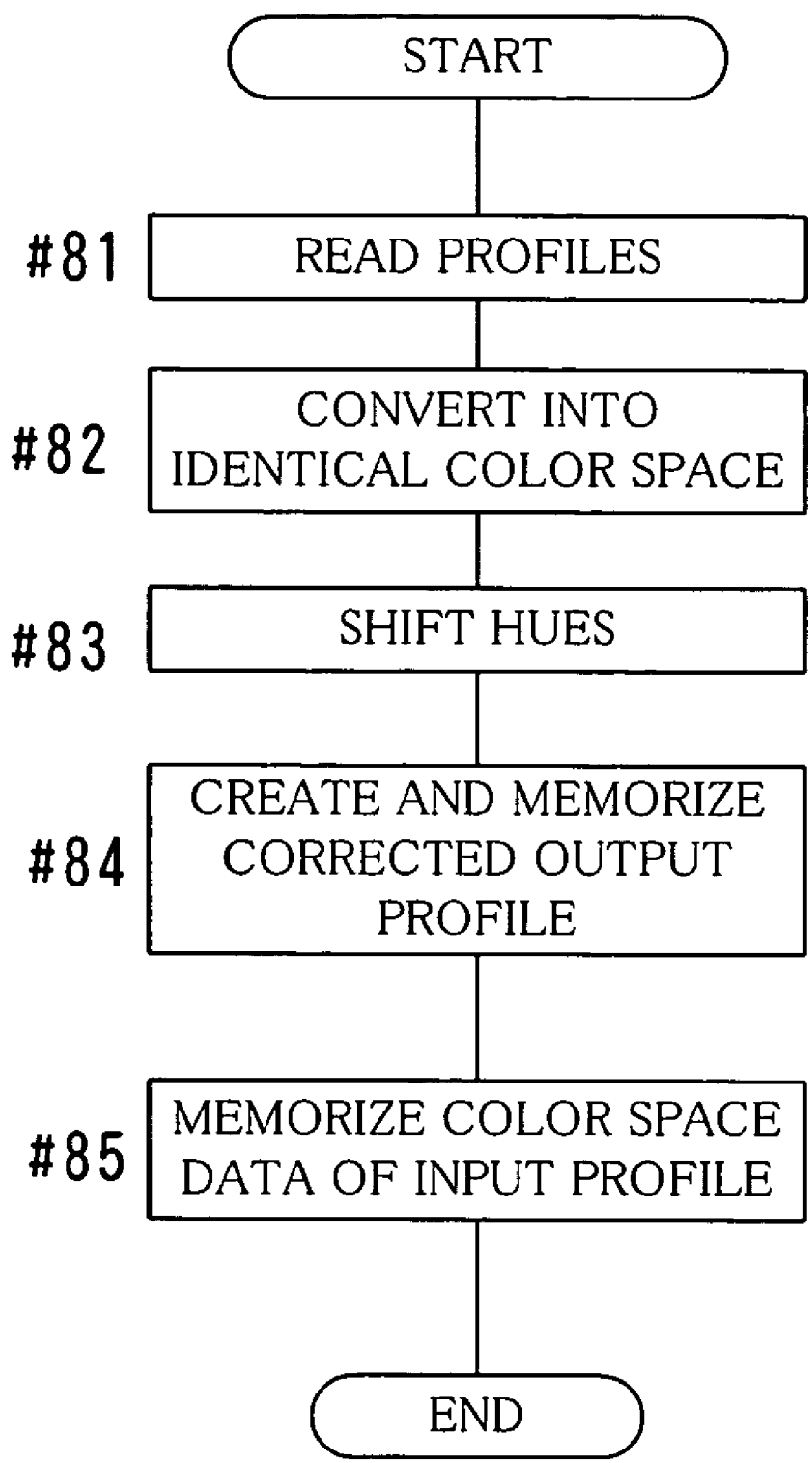
FIG. 16 is a flowchart showing a process of the preparatory stage in the image processing system.
Figure 17:
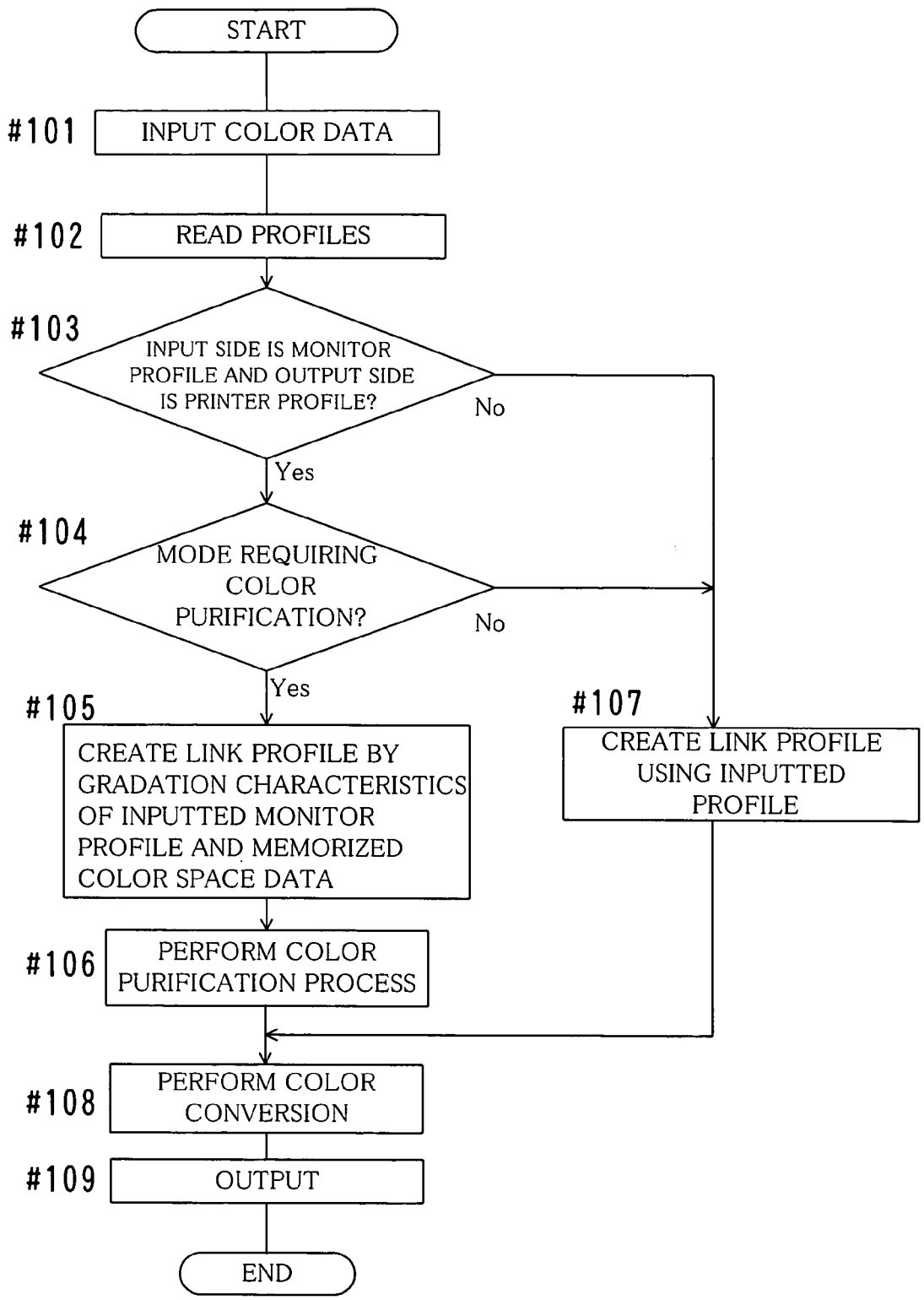
FIG. 17 is a flowchart showing the color conversion process in the execution stage.

FIG. 16 is a flowchart showing a process of the preparatory stage in the image processing system and FIG. 17 is a flowchart showing the color conversion process in the execution stage.

Referring to FIG. 16, in the preparatory stage, profiles of an input device and an output device are read (#81). Based on the profiles, hues are converted into color spaces common to each other to be represented (#82). In the input device and the output device, the hues are moved so that hues of colors corresponding to pure colors coincide with each other (#83). An output profile that is corrected by moving the hue is created. The output profile thus created is memorized in a memory area (#84). Color space data of an input profile at that time are memorized in a memory area (#85).

Subsequently, in the execution stage, a process shown in FIG. 17 is performed. First, color data CD are inputted (#101) and device profiles on an input side and an output side are inputted (#102). The read profiles on the input side and the output side are checked (#103). In other words, when the read profile on the input side is a profile of a display (a monitor) and the read profile on the output side is a profile of a printer (Yes in #103), the process goes to step #105. Otherwise, the process goes to step #107.

In step #104, it is checked whether or not a mode is a mode requiring color purification. Here, the mode requiring color purification is, for example, a business mode for printing an image or a figure with computer graphics. A user can set such a mode by an appropriate operation and process. In the case of Yes in the step #104, the process goes to the step #105.

In the step #105, as mentioned above, a link profile LP1 is created by using gradation characteristics out of a read profile on the input side, color space data preliminarily memorized in a color management module and the corrected output profile PF2A.

Then, in step #106, a color purification process is performed on the link profile LP1. In step #108, color conversion is performed using the link profile LP1a on which the correction process is performed by the color purification. In step #109, color data CD2 on which color conversion is performed are outputted.

In the case of No in the step #103, a link profile LP1 is created in the step #107 using the read profiles on the input side and the output side. After that, color conversion is performed using the created link profile LP1 or the link profile LP1a on which an appropriate correction is performed.

[Second Embodiment]

Next, a second embodiment is described. The second embodiment differs from the first invention only in a method for deciding whether or not a color space PF1c that is memorized in advance is used in an execution stage, and the others are common to the first and second embodiments. In other words, a general structure of an image processing system 1 and process contents thereof are the same as in the first embodiment. Accordingly, explanation is given to only FIG. 18 that is a difference between the first and the second embodiments.

Figure 18:
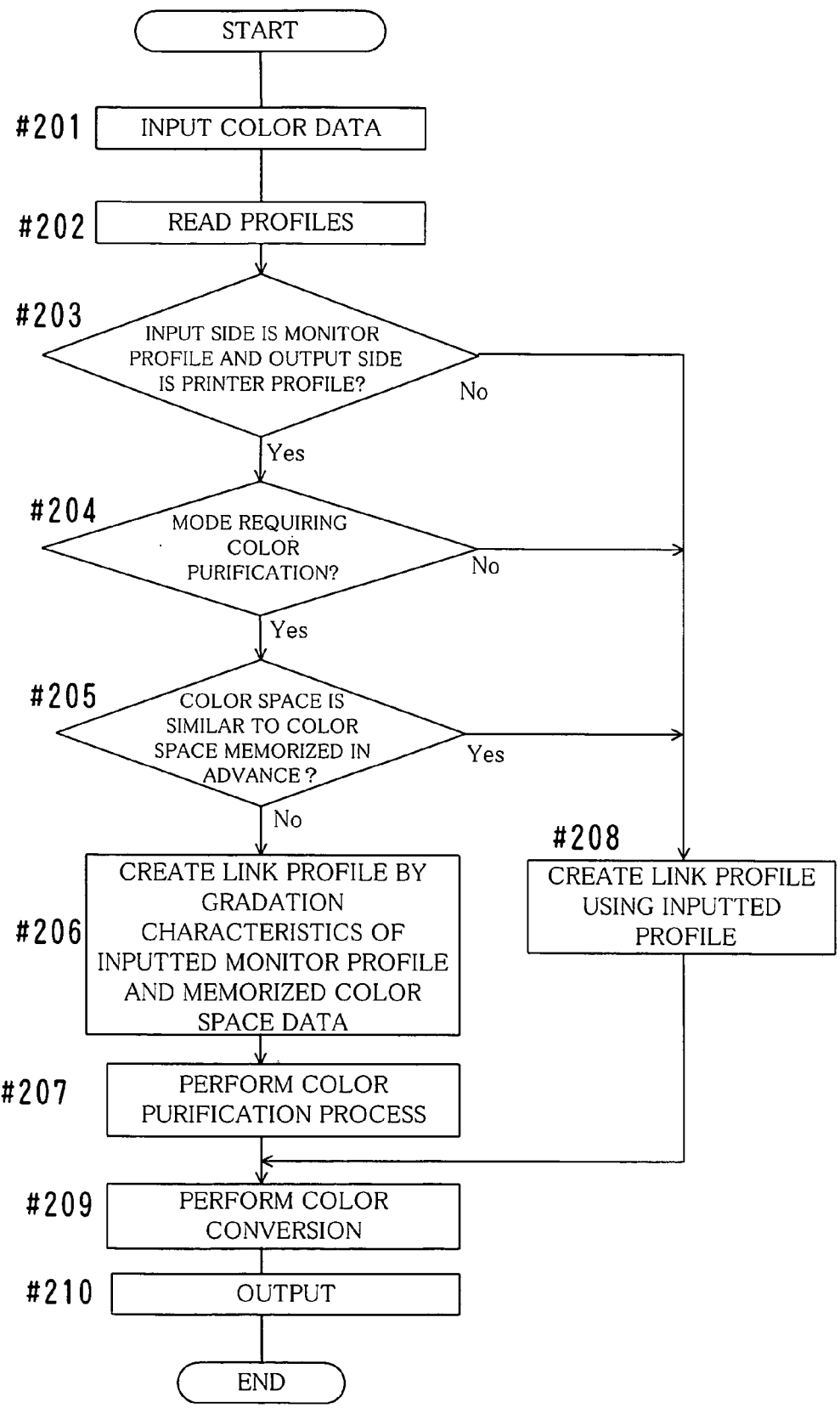
FIG. 18 is a flowchart showing the color conversion process in the execution stage according to a second embodiment.

FIG. 18 is a flowchart showing a color conversion process in an execution stage according to a second embodiment. FIG. 18 corresponds to FIG. 17 in the first embodiment.

In FIG. 18, steps #201–204 and #206–210 are identical to the steps #101–104 and #105–109, respectively.

In step #205, when a profile of a display is read, it is decided whether or not the profile is similar to the color space PF1c memorized in advance. More specifically, when a color space of the inputted profile is identical to the color space PF1c memorized in advance or within a range of a predetermined threshold level, the process goes to the step #208. Otherwise, i.e., when the color spaces substantially differ from each other, the process goes to the step #206.

Here, decision as to whether or not the color space of the inputted profile is identical to the color space PF1c memorized in advance or within a range of a predetermined threshold level is made by the following procedure.

For example, each color of RGB in the color space of the inputted profile is converted into an LCH space and a hue is expressed in a degree ranging from 0 degree to 360 degree. In such a case, when a hue difference among colors falls within plus or minus 2 degrees or less, it is decided that the color space of the inputted profile is close to the color space PF1c memorized in advance. In this case, a hue difference of plus or minus 2 degrees in the LCH space is used as the threshold level. Instead of the plus or minus 2 degrees, plus or minus 1 degree, plus or minus 3 degrees or other values may be used.

Alternatively, the decision may be made based on a value of a matrix MX1 indicating a color space PF1Bc of an inputted profile (an input profile PF1B). On this occasion, decision is made by, for example, whether or not the sum of the absolute values of differences among coefficients of the matrix MX1 is a fixed value or less.

The second embodiment can also produce effects similar to the case of the first embodiment. More particularly, when various displays are used, bright colors and gradation are reproduced by color purification. In addition, continuity of colors is maintained at the vicinity of a portion where a color purification process is performed. Since gradation characteristics PF1Bt of a display to be used is taken advantage without any change, appearances of images between the input device and the output device accord with each other. Further, when the color space PF1Bc of a profile on an input side is close to the color space PF1c memorized in advance, the color space PF1Bc of the inputted profile is used. Accordingly, an accurate link profile LP1 suitable for the input device can be created, so that color conversion is performed with precision.

In the embodiments discussed above, the color space PF1c memorized in a color management module is "color space data for performing color conversion on color data having specific color space characteristics" and also corresponds to "color space data maintained in advance" in the present invention.

Further, the gradation characteristics PF1Bt of the input profile PF1B and characteristics of the color space PF1Bc respectively correspond to "gradation conversion data with respect to inputted color data" and "color space characteristics of inputted color data" in the present invention. Angle of a hue difference in the LCH space, the sum of the absolute values of differences among coefficients of the matrix MX1 and others correspond to "difference of color space characteristics" in the present invention.

The process function of the step #205 corresponds to "a comparison portion" in the present invention. Each of the process function of the steps #107 and #108 and the process function of the steps #208 and #209 corresponds to "a first conversion portion" in the present invention. Each of the process function of the steps #105 to #108 and the process function of the steps #206 to #209 corresponds to "a second conversion portion" in the present invention.

In the embodiments mentioned above, it is possible to shift functions or the process order in the multidimensional look-up table LLU appropriately. It is also possible to omit or add functions or processes in accordance with contents of color conversion.

In the embodiments described above, a matrix may be used in lieu of the multidimensional look-up table LLU. Such a matrix can be arithmetic expressions for color conversion, coefficients for operation, a program for operation or other conversion operation means.

In the embodiments mentioned above, the correction process portion 102 performs a color purification process. Instead, the color purification process may be performed at the same time with creation of a link profile LP1 in the link profile creation portion 101.

Structures, shapes, sizes, the number, processing contents and processing order of each part or whole part of the main unit 10 and the image processing system 1 can be varied as required within the scope of the present invention.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A color conversion method for performing color conversion on inputted color data to convert the inputted color data into color data having a color space different from that of the inputted color data, the method comprising:
    holding color space data in advance, the color space data being used for performing color conversion on color data having specific color space characteristics;
    comparing color space characteristics of the inputted color data with color space characteristics of the color space data that are held in advance;
    performing color conversion using gradation conversion data with respect to the inputted color data and color space data with respect to the inputted color data when a difference between the color space characteristics of the inputted color data and the color space characteristics of the color space data that are held in advance is a set threshold level or less; and
    performing color conversion using the gradation conversion data with respect to the inputted color data and the color space data that are held in advance when the difference between the color space characteristics of the inputted color data and the color space characteristics of the color space data that are held in advance is over the set threshold level.

2. The color conversion method according to claim 1, wherein the gradation conversion data and the color space data with respect to the inputted color data are included in a device profile relating to the inputted color data.

3. The color conversion method according to claim 1, wherein the color conversion includes a color purification process for outputting color data with a one-color material or a two-color material.

4. An image processor for performing color conversion on inputted color data to output color data having a color space different from that of the inputted color data, the image processor comprising:
    a memory portion for memorizing color space data used for performing color conversion on color data having specific color space characteristics;
    a comparison portion for comparing color space characteristics of the inputted color data with color space characteristics of the color space data that are held in advance;
    a first conversion portion for performing color conversion using gradation conversion data with respect to the inputted color data and color space data with respect to the inputted color data when a difference between the color space characteristics of the inputted color data and the color space characteristics of the color space data that are held in advance is a set threshold level or less; and
    a second conversion portion for performing color conversion using the gradation conversion data with respect to the inputted color data and the color space data that are held in advance when the difference between the color space characteristics of the inputted color data and the color space characteristics of the color space data that are held in advance is over the set threshold level.

5. The image processor according to claim 4, further comprising:
    a color purification process portion for performing a color purification process for outputting color data with a one-color material or a two-color material, wherein
    the color purification process portion performs the color purification process on the inputted color data when the inputted color data are graphic data.

6. An image processor for performing color conversion on inputted color data to output color data having a color space different from that of the inputted color data, the image processor comprising:
    a memory portion for memorizing color space data used for performing color conversion on color data having specific color space characteristics; and
    a conversion portion for performing color conversion using gradation conversion data with respect to the inputted color data and the color space data that are held in advance, and
    a determination portion for determining to use inputted color space data for color conversion when the inputted color data are photographic data, and to use the color space data memorized in the memory portion for color conversion when the inputted color data are graphic data.

7. The image processor according to claim 6, further comprising:

a color purification process portion for performing a color purification process for outputting color data with a one-color material or a two-color material, wherein the color purification process portion performs the color purification process on the inputted color data when the inputted color data are graphic data, and the conversion portion performs color conversion using the gradation conversion data with respect to the inputted color data and color space data of the inputted color data, and the color purification process portion does not perform the color purification process on the inputted color data when the inputted color data are photograph data.

8. An image processor for performing color conversion on inputted color data to output color data having a color space different from that of the inputted color data, the image processor comprising:

a memory portion for memorizing color space data used for performing color conversion on color data having specific color space characteristics; and a conversion portion for performing color conversion using gradation conversion data with respect to the inputted color data and the color space data that are held in advance, further comprising:

a color purification process portion for performing a color purification process for outputting color data with a one-color material or a two-color material, wherein the color purification process portion performs the color purification process on the inputted color data when the inputted color data are graphic data, and the conversion portion performs color conversion using the gradation conversion data with respect to the inputted color data and color space data of the inputted color data, and the color purification process portion does not perform the color purification process on the inputted color data when the inputted color data are photograph data.

* * * * *